F. C. PAHLOW.
PIPE COUPLING.
APPLICATION FILED MAY 22, 1908.
949,329.
Patented Feb. 15, 1910.
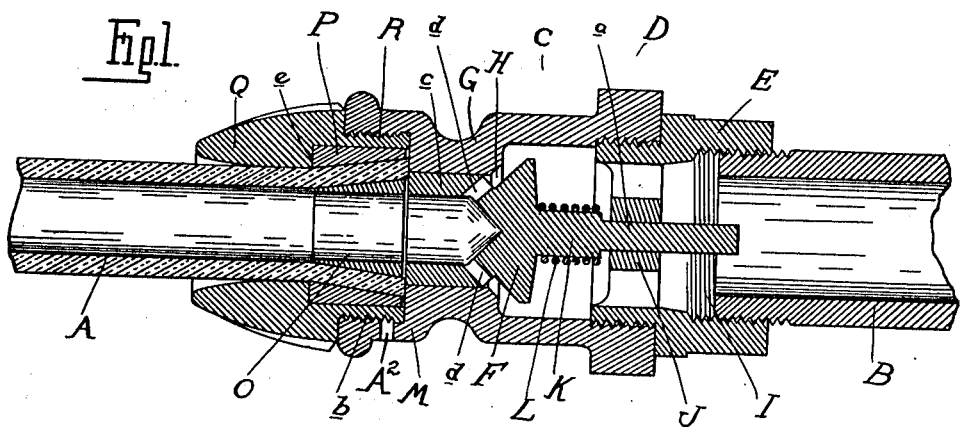
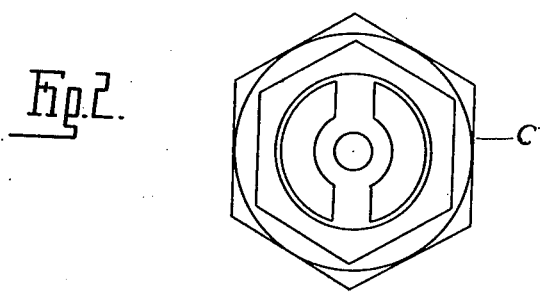
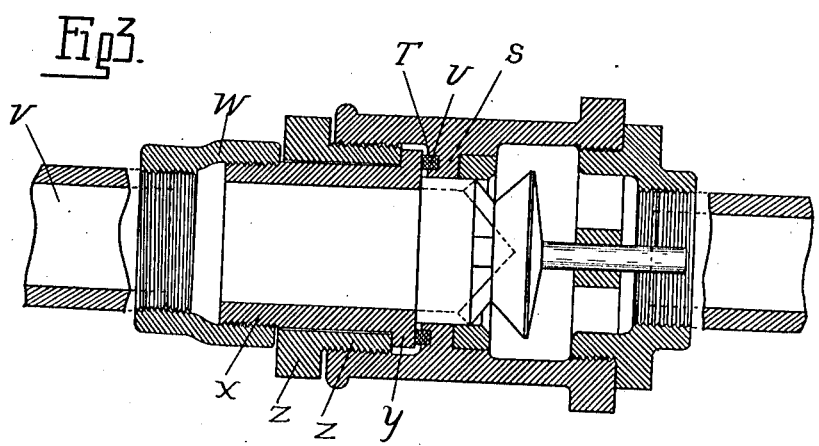
Witnesses
W. K. Ford
H. J. Belknap
Inventor
Frank C. Pahlow
By Whittemore, Hulbert & Whittemore
Attys

UNITED STATES PATENT OFFICE.

FRANK C. PAHLOW, OF DETROIT, MICHIGAN, ASSIGNOR OF ONE-HALF TO ANTONIO C. PESSANO, OF DETROIT, MICHIGAN.

PIPE-COUPLING.

949,329.

Specification of Letters Patent. Patented Feb. 15, 1910.

Application filed May 22, 1908. Serial No. 434,306.

*To all whom it may concern:*

Be it known that I, FRANK C. PAHLOW, a citizen of the United States of America, residing at Detroit, in the county of Wayne and State of Michigan, have invented certain new and useful Improvements in Pipe-Couplings, of which the following is a specification, reference being had therein to the accompanying drawings.

The invention relates to a coupling for connecting a pipe or hose with a source of fluid supply, the invention being in this instance designed for use in connection with pneumatic tools, and it consists in the novel construction of a coupling of this type provided with a normally seated valve to prevent the escape of air and adapted to be automatically raised from its seat upon coupling, as will be hereinafter set forth.

The invention further consists in the peculiar arrangement and combination of the various parts of the coupling, and in certain details of construction as will be hereinafter more fully pointed out.

In the drawings,—Figure 1 is a vertical central section through the coupling; Fig. 2 is an end view thereof; and Fig. 3 is a vertical central section through a modification.

In Figs. 1 and 2 of the drawings I have shown a coupling especially designed for connecting a hose leading to a pneumatic tool with a source of air supply, the reference-letter A designating the hose and B the supply pipe. C represents the coupling. In construction, the latter comprises a sectional valve casing D, one of the members or sections E carrying the valve F, and the section G the valve seat H, the sections having a screw-threaded engagement one with the other, as illustrated. The section E of the casing is provided with a nipple I adapted to engage the pipe B leading to the source of supply, and internally with a spider frame J, centrally apertured, as at $a$, to form a tubular bearing for the stem K of the valve F. I preferably interpose between the valve proper and the bearing described a coil spring L which serves to hold the valve normally to its seat, thus preventing the escape of air. The valve casing described is preferably formed with a tubular extension M internally screw-threaded, as at $b$, at its outer end, and the valve F is formed with a tubular extension $c$ which projects within the casing extension in the path of the complementary pipe section, and is adapted to be operated by said section during the operation of coupling. The valve extension described is provided with a plurality of ports $d$ through which the air passes from the supply when the valve is raised from its seat. Fitted within the end of the pipe A leading to the tool is a tapered thimble O, and encircling the pipe end is a correspondingly tapered wedge ring P, the parts acting conjointly to form a clamp for the free end of the pipe, as shown. Q represents a tubular coupling member provided with a shoulder $e$ adapted to engage the rear end of the wedge ring, and with a reduced and externally threaded end R adapted upon coupling to engage the internal thread $b$ in the casing end.

In practice, the valve casing is screwed upon the pipe leading to the air supply, and the valve either through its spring or the air pressure is held to its seat, preventing the escape of air. The tubular clamp is applied to the end of the hose in such manner that the latter will project slightly beyond the clamp, as shown in Fig. 1, the projecting portion bearing during the operation of coupling against a shoulder $a$ on the valve casing, forming a packing or gasket intermediate the sections to be coupled. The coupling member Q of the coupling engages both the wedge ring of the clamp, and the valve casing forcing the hose section A during the operation of coupling into engagement with the valve extension, thereby forming a tight joint between the parts, while the longitudinal movement imparted to the hose raises the valve from its seat. Thus, as the coupling is effected the valve is operated and the necessary passage is provided leading from the source of air supply to the tool to be operated.

In Fig. 3 I have shown a modified form of coupling designed for direct attachment to the tool or with the metallic pipe leading to the tool. The valve casing in this instance is of the sectional construction as previously described, and is provided interiorly with an annular shoulder S, recessed as at T, in which is seated a suitable gasket U. The section of piping V leading to the tool carries at its meeting end a tubular internally threaded member W, and a similar member X having a threaded engagement with the first-mentioned member, and provided at its end with an outwardly extending annular flange Y insertible within the outlet of the casing and adapted upon coupling to abut against the gasket U. Mounted upon the member X is a coupling ring Z having a suitable wrench-hold formed upon its exterior to permit of its operation, and carrying an externally threaded reduced section Z' extending intermediate the member X and the valve casing, and having a threaded engagement with the latter, as illustrated. As the coupling is effected by the rotation of the coupling ring, the member X is forced a sufficient distance within the valve casing to expand the gasket and to force the valve from its seat, the valve extension projecting normally beyond the gasket for this purpose.

When it is desired to uncouple the members A and B, if the pressure in the member A is high, when the nut Q is nearly unscrewed from the tubular extension M, unless some means is provided for permitting the escape of the fluid in the member A, the threads on one or both of said members would be badly torn, if not entirely stripped therefrom. I therefore provide a vent or relief port $A^2$ in the extension M, which is so positioned as to be normally closed by the threaded end R of the member Q, and to be opened upon the end R being unscrewed sufficiently to permit the valve to seat.

What I claim as my invention is,—

1. In a coupling, the combination with two conduit sections, of a sectional valve casing connecting said conduit sections comprising a member engaging one of the conduit sections and having an externally threaded outer end, a second member having its ends internally threaded and having a reduced portion intermediate its ends forming a valve seat, one of the ends of said second member engaging the externally threaded outer end of said first-mentioned member, a valve engaging said seat, a spring for normally holding the valve to its seat, said valve having a portion extending beyond said reduced portion when the valve is closed, a tapering thimble seated entirely within the other conduit section, a wedge ring encircling said section over said thimble forming in connection therewith a tubular clamp, and a coupling member for connecting the clamp to the casing comprising a tubular nut provided with a shoulder abutting against the outer end of the wedge ring and a reduced externally threaded portion adapted to engage the internal thread of the other end of said second member.

2. In a coupling, the combination with two conduit sections, of a sectional valve casing connecting said conduit sections comprising a member having one of its ends internally threaded to engage one of the conduit sections, and a reduced externally threaded portion on its outer end and a centrally apertured spider frame carried by said reduced portion, a second member having its ends internally threaded and having a reduced portion intermediate its ends forming a valve seat, one of said ends engaging the reduced externally threaded portion of said first-mentioned member, a valve engaging said valve seat having its stem passing through the aperture in the spider frame, a spring for normally holding the valve to its seat, said valve having a portion thereof extending beyond said reduced portion when the valve is closed, a tapering thimble within the end of the other conduit section, a wedge ring encircling the last mentioned conduit section over said thimble forming in connection with the latter a tubular clamp, and a coupling member for connecting the clamp to the casing comprising a tubular nut provided with a shoulder abutting against the outer end of the wedge ring, and a reduced externally threaded section adapted to engage the internal thread of the other end of said second member.

3. In a coupling, the combination with two conduit sections, of a valve casing connected to one of said conduit sections having an internally-threaded tubular extension, and a portion of smaller diameter at the inner end of said internally-threaded extension forming a bearing, a tapering thimble seated entirely within the other conduit section, a wedge ring encircling said section over said thimble forming in connection therewith a tubular clamp, the end of the conduit protruding slightly beyond said clamp, and a coupling member for connecting the clamp to the casing comprising a tubular nut provided with a shoulder abutting against the outer end of the wedge ring and a reduced externally-threaded section engaging the internal thread of the tubular extension and clamping the protruding end of the conduit firmly against said bearing.

In testimony whereof I affix my signature in presence of two witnesses.

FRANK C. PAHLOW.

Witnesses:
DWIGHT TRUE,
CHARLES SHORT.